United States Patent

[11] 3,581,066

[72] Inventors Douglas R. Maure
San Marino,
Mei Goon Wong, Los Angeles, both of, Calif.

[21] Appl. No. 711,066
[22] Filed Mar. 6, 1968
[45] Patented May 25, 1971
[73] Assignee Lear Siegler, Inc.
Santa Monica, Calif.

[54] PROGRAMMABLE COUNTING CIRCUIT
18 Claims, 5 Drawing Figs.

[52] U.S. Cl. 235/92, 328/48
[51] Int. Cl. H03k 21/32
[50] Field of Search 235/92, 13.1, 60, 37, 63, 50, 69, 52, 96; 328/48; 340/146.2

[56] References Cited

UNITED STATES PATENTS

| | | | |
|---|---|---|---|
| 3,147,442 | 9/1964 | Fritzche et al. | 328/48 |
| 3,383,525 | 5/1968 | Arksey | 328/48 |
| 3,456,200 | 7/1969 | Bos | 328/48 |

*Primary Examiner*—Maynard R. Wilbur
*Assistant Examiner*—Joseph M. Thesz
*Attorney*—Christie, Parker & Hale

ABSTRACT: A programmable counting circuit in which the cycling of a multistage counter is controlled by reset information and truncation information stored in no more than two registers. A detection circuit generates a "forward carry" signal when the contents of the counter match the contents of a reset register and generates a "reverse carry" signal when the forward carry signal appears in a stage for which a bit is presented in a truncation register. The detection circuit utilizes the "reverse carry" signal to generate reset signals for the counter stage associated with the bit and all prior stages. The detection circuit utilizes subsequent bits in the truncation register to effect the resetting of subsequent groups of stages of the counter whenever the contents of these groups match the corresponding contents of the reset counter. In another embodiment, decoding circuitry utilizes an additional information bit in the reset register to present truncation information sufficient for a single truncation in the absence of a truncation register.

INVENTORS.
DOUGLAS R. MAURE
MEI GOON WONG
BY Christie, Parker & Hale
ATTORNEYS.

INVENTORS.
DOUGLAS R. MAURE
MEI GOON WONG
BY Christie, Parker & Hale
ATTORNEYS.

INVENTORS.
DOUGLAS R. MAURE
MEI GOON WONG
BY
Christie, Parker & Hale
ATTORNEYS.

INVENTORS
DOUGLAS R. MAURE
MEI GOON WONG
BY
Christie, Parker & Hale
ATTORNEYS.

INVENTORS.
DOUGLAS R. MAURE
MEI GOON WONG
BY
Christie, Parker & Hale
ATTORNEYS.

PROGRAMMABLE COUNTING CIRCUIT

BACKGROUND OF THE INVENTION

This invention relates to counting circuits and, more particularly, to counting circuits which may be truncated under program control to present predetermined sequences of signals.

In information handling systems it frequently is necessary to generate a plurality of signals in accordance with a predetermined sequence. Such signals are generally required in multiplexing, commutating and decommutating operations, for example. A sequence of signals has been provided in some prior art systems by counting circuitry which is wired to produce a single particular sequence of signals. Such circuitry, however, has the disadvantage of inflexibility. It cannot provide any predetermined sequence of signals other than the wired-in sequence unless physical wiring changes are made in the circuitry.

An advantage of the present invention is that it provides an improved counting circuit programmable to provide a plurality of different predetermined sequences of signals.

Circuitry for providing predetermined sequences of signals may advantageously utilize a single multistage counting circuit which is truncated a plurality of times to present a plurality of truncated sections. Each truncated section is reset when its count reaches a predetermined value and each section is utilized to drive the succeeding circuitry. A prior art system in which truncated counting circuits have been used requires two registers for each truncation of the counting circuit. A preset register manifests a particular value of count associated with its respective truncated section and a mask register manifests the stages of the circuit to be reset when the section reaches the particular count. As the number of truncations within a multistage counting circuit increases, however, the cost and space requirements necessitated by the provision of two registers for each truncation becomes excessive.

Another advantage of the present invention is that it provides a programmable counting circuit in which two registers are able to truncate a multistage counting circuit any desired number of times.

A further advantage of the present invention is that it provides a programmable counting circuit capable of utilizing a single register to achieve a single truncation of a multistage counting circuit.

Another advantage of the present invention is that it provides an improved programmable counting circuit which achieves a savings in cost over prior art circuitry.

SUMMARY OF THE INVENTION

In brief, the preceding and additional advantages are achieved in a system utilizing a multistage binary counter driven by a source of clock signals. The cycling of the counter is controlled by the contents of a reset register and a truncation register. Each stage of the counter is individually reset under control of the information stored in these registers and the stages may be grouped to form counter lengths other than binary multiplex. For example, a 15 stage counter may be programmed to operate as three counters, one driving another, with periodicities of four, three and two rather than as a single counter having a periodicity of 32,768.

The reset register is used to store the known numbers at which the groups of stages are to be reset and the truncation register is used to store truncation information which manifests the length of each such group. A detection circuit utilizes the contents of the reset and truncation registers to generate signals which reset the groups of stages. The detection circuitry generates a "forward carry" signal when the contents of the reset register match that of the counter. The "-forward carry" signal progresses along the stages of the counter for as many stages as the counter information matches the contents of the reset register. A "reverse carry" signal is generated whenever a "forward carry" signal coincides with a bit stored in the truncation register. When such coincidence occurs the detection circuitry generates a "reverse carry" signal which, in turn, generates signals which reset the counter stage associated with the bit and all previous stages. Similar bits in subsequent locations within the truncation register effect resetting of subsequent groups of stages of the counter whenever the contents of these groups match the corresponding contents of the reset register.

In another embodiment detection circuitry utilizes a single truncation bit stored in the reset register, in the stage immediately subsequent to the reset value, to accomplish a single truncation of the binary counter without use of a truncation register.

BRIEF DESCRIPTION OF THE DRAWING

The manner of operation of the present invention and the manner in which it achieves the above and other advantages may be more clearly understood by reference to the following detailed description when considered with the drawing in which.

DETAILED DESCRIPTION

Figure 1:
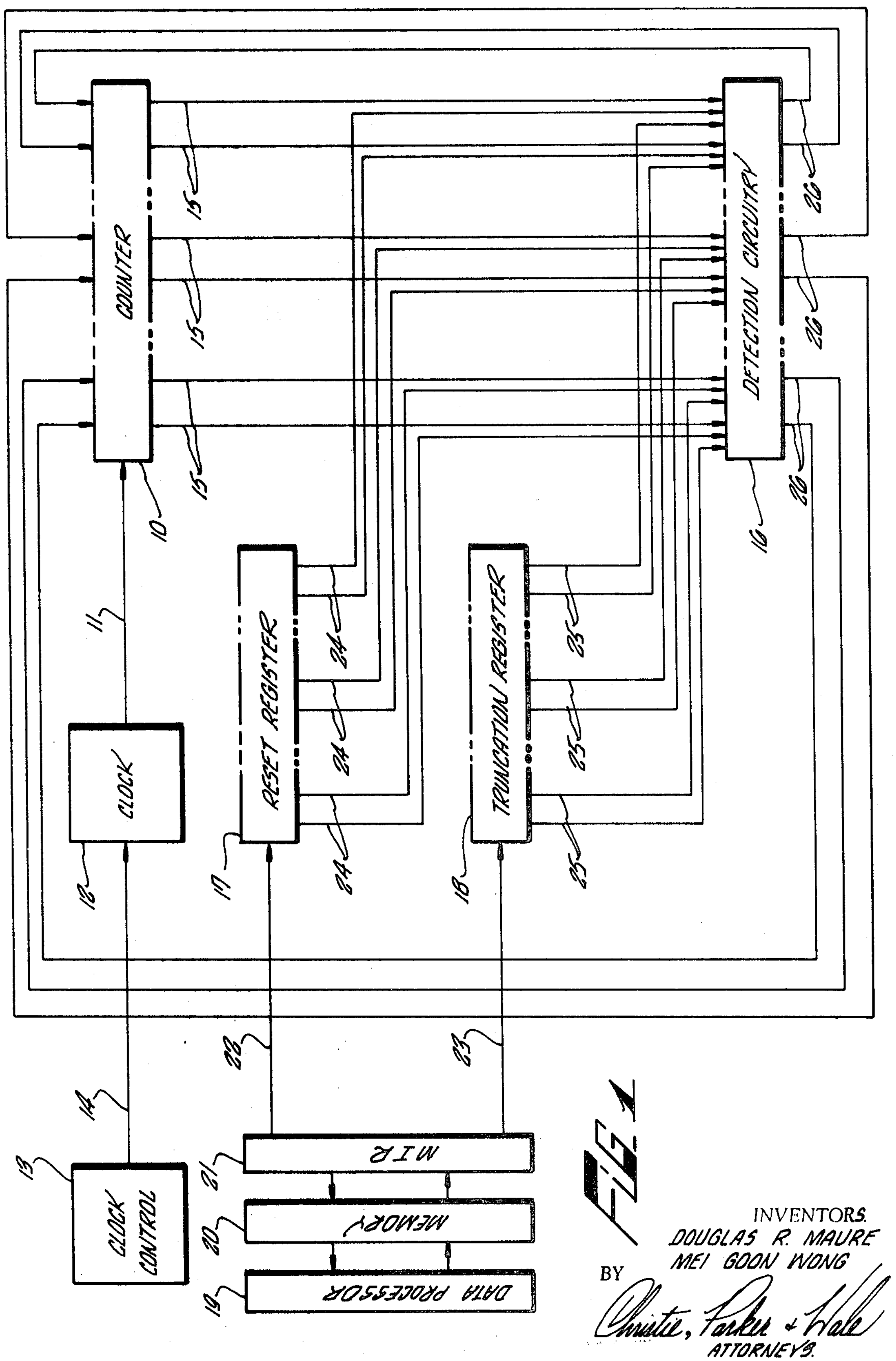
FIG. 1 depicts a general block diagram of the programmable counting circuit according to the present invention.

FIG. 1 depicts a general block diagram of the programmable counting circuit according to the present invention. Binary counting circuit 10 is driven via line 11 by a source of clock signals 12. Control circuit 13 may be utilized to control source 12 via line 14. Counter 10 may advantageously comprise an *n* stage binary counter of conventional design. Counting circuit 10 presents signals on *n* output lines 15 indicative of the value stored in the *n* stages of the counter. Lines 15 present signals indicative of the value stored in counter 10 to detection circuitry 16. Reset register 17 and truncation register 18 store information values used to control the cycling of counter 10. The information stored in these registers, and consequently the cycling of counter 10, may be provided programmatically by well-known techniques. Thus, for example, the contents of registers 17 and 18 may be provided by data processor 19, memory 20 and memory information register 21, via lines 22 and 23, respectively.

The contents of reset register 17 are used to store predetermined numbers which, when matched by values within the stages of counter 10, are utilized to reset groups of these stages. Truncation register 18 stores bits in bit locations thereof which are utilized to manifest the length of each such truncated grouping within counter 10. The contents of registers 17 and 18 are utilized in accordance with the principles of the present invention to cause the multistage counter 10 to operate as a plurality of counters having fewer stages, one counter following another, and to effect reset of each such counter whenever it reaches a predetermined count. Thus, for example, if counter 10 were to have 15 stages, bits in the sixth, eleventh and fifteenth bit locations of register 18 could be utilized to cause counter 10 to operate as three counters of six stages, five stages and four stages, respectively, one driving the other. The six stage counter would be reset when its count matches the value stored in the first six bit locations of the reset register 17; both the first and second counters would be reset when their contents match the values stored in the first 11 stages of register 17; and all three counters would be reset whenever the counter reaches the value stored in all 15 stages of register 17. Thus, the cycling of counting circuit 10 is governed by the contents of registers 17 and 18 which contents may advantageously be changed as desired by conventional programming techniques. Furthermore, the counting circuit 10 is caused to generate a sequence of signals as determined by the contents of reset register 17 and truncation register 18.

Detection circuitry 16 is utilized to compare the contents of counter 10 and reset register 17 and to effect reset of the proper stages of counter 10 whenever a match occurs between corresponding stages of counter 10 and reset register 17 which comprise a truncated section of counter 10 as manifested by the contents of truncation register 18.

The contents of register 17 are presented to detection circuitry 16 via $n$ lines 24 and the contents of register 18 are presented to detection circuitry 16 via $n$ lines 25. Reset signals generated by detection circuitry 16 are presented to counter 10 via $n$ lines 26.

Figure 2:
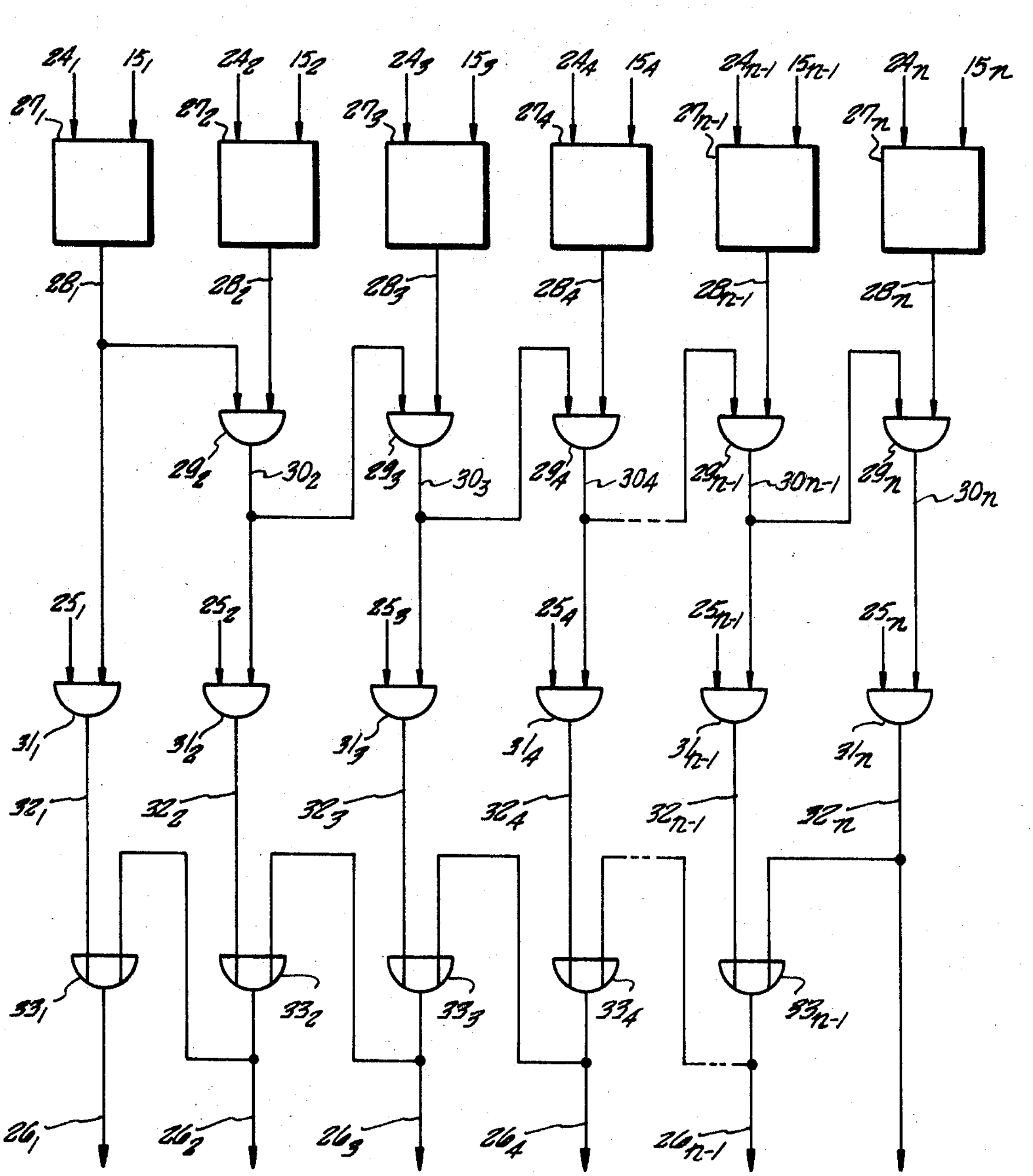
FIG. 2 depicts in greater detail the detection circuitry of FIG. 1 in which the stages of the detection circuitry are connected in series.

FIG. 2 depicts in greater detail the detection circuitry of FIG. 1 in which the stages of the detection circuitry are connected in series. FIG. 2 depicts stages 1, 2, 3, 4, ... "$n-1$" and "$n$" of detection circuitry 16. Signals on lines $24_1$ through $24_n$ and signals on lines $15_1$ through $15_n$ are presented to respective ones of comparison circuits $27_1$ through $27_n$. Comparison circuits 27 are shown in block diagram form and may comprise any well-known circuit capable of comparing signals on two lines and presenting a signal on an output line when there is an identity between the signals presented on the two input lines. Each comparison circuit 27 compares the bit stored in a particular stage of counter 10 and the corresponding bit stored in reset register 17 and presents an output signal on its associated one of the lines 28 when a match is detected.

Signals on lines $28_2$ through $28_n$ are respectively presented to AND gates $29_2$ through $29_n$. Additionally, the signal on line $28_1$ is presented to AND gate $29_2$. Gates $29_2$ through $29_n$, when enabled, present signals on output lines $30_2$ through $30_n$ and signals on lines $30_2$ through $30_{n11}$ are presented respectively to input terminals of AND gates $29_3$ through $29_n$.

Additionally, signals on line $28_1$ are presented to AND gate $31_1$ and signals on lines $30_2$ through $30_n$ are presented to AND gates $31_2$ through $31_n$, respectively. Signals on lines $25_1$ through $25_n$ from truncation register 18 are presented to input terminals of AND gates $31_1$ through $31_n$, respectively. When enabled, AND gates $31_1$ through $31_n$ present output signals on lines $32_1$ through $32_n$, respectively. Signals on lines $32_1$ through $32_{n11}$ are presented to OR gates $33_1$ through $33_{n11}$, respectively.

When enabled, OR gates $33_1$ through $33_{n11}$ present output signals on lines $26_1$ through $26_{n11}$. Signals present on lines $26_2$ through $26_n$ and $32_n$ are presented to input terminals of OR gates $33_1$ through $33_{n11}$, respectively. Signals on lines $26_1$ through $26_{n11}$ and on line $32_n$ are utilized to reset counting circuit 10.

The manner in which the detection circuitry depicted in FIG. 2 effects the recycling of counting circuit 10 under the control of the contents of registers 17 and 18 may best be understood by way of example. As depicted in FIG. 2, the left-most bit in counter 10 is the least significant bit. If, for example, the reset register 17 contains the binary value "011" in its first three stages and the truncation register 18 contains the binary value "001" in its first three stages, the first three stages of counter 10 will be reset whenever its count reaches the value "011." Whenever a comparison is detected by circuit $27_1$, a "forward carry" signal is presented on line $28_1$ and is presented to AND gate $29_2$. Unless comparison circuit $27_2$ simultaneously detects an identity between the signals presented on lines $24_2$ and $15_2$, the "forward carry" signal will not be passed by AND gate $29_2$. If both comparison circuits $27_1$ and $27_2$ detect identities, the "forward carry" signal will be passed by AND gate $29_2$ and will be presented to AND gate $29_3$. Since truncation register 18 has a binary "0" stored in its first two stages, no signal will be presented on either line $25_1$ or on line $25_2$ and consequently no "reverse carry" signal will be presented on line $32_1$ or $32_2$. When, however, a comparison is detected by all three of the comparison circuits $27_1$, $27_2$ and $27_3$, the "forward carry" signal will be passed by gate $29_3$ and presented via line $30_3$ to AND gate $31_3$. Since, in the example, truncation register 18 has a binary "1" in the third bit location, a signal is presented on line $25_3$ which is coincident with the "forward carry" signal presented on line $30_3$. Consequently a "reverse carry" signal is presented on line $32_3$, which signal enables OR gate $33_3$. The "reverse carry" signal passed by OR gate $33_3$, in turn, enables both OR gates $33_2$ and $33_1$. Consequently output signals are presented on lines $26_1$, $26_2$ and $26_3$, which signals are effective to reset the first three stages of counting circuit 10 in a conventional manner. Thus, it is seen that each time counting circuit 10 reaches a count of "011"in its first three stages it will be reset since this value is stored in the first three stages of reset register 17, and since truncation register 18 indicates that the first truncation section within counter 10 is made up of three stages.

In a similar manner, the detection circuitry shown in FIG. 2 may be utilized to effect reset of subsequent truncation sections within counting circuit 10. Thus, for example, a binary "1" in the $(n-1)$th stage of truncation register 18 will effect a reset of the first "$n-1$ stages of counting circuit 10 whenever the counting circuit 10 reaches a count which matches the value stored in the first "$n-1$ bit locations of reset register 17. When such a match occurs, the "forward carry" signal which is initiated on line $28_1$ is carried forward via gates $29_2$ through $29_{n11}$ and is presented to AND gate $31_{n11}$. Simultaneously the signal presented on line $25_{n11}$ indicative of the aforesaid truncation bit is also presented to gate $31_{n11}$. Consequently, a "reverse carry" signal is carried back from line $26_{n11}$ via gates $33_1$ through $33_{n12}$ and reset signals are consequently presented on each of the reset lines $26_1$ through $26_{n11}$ which are effective to reset the first "$n-1$ stages of counting circuit 10.

Figure 3:
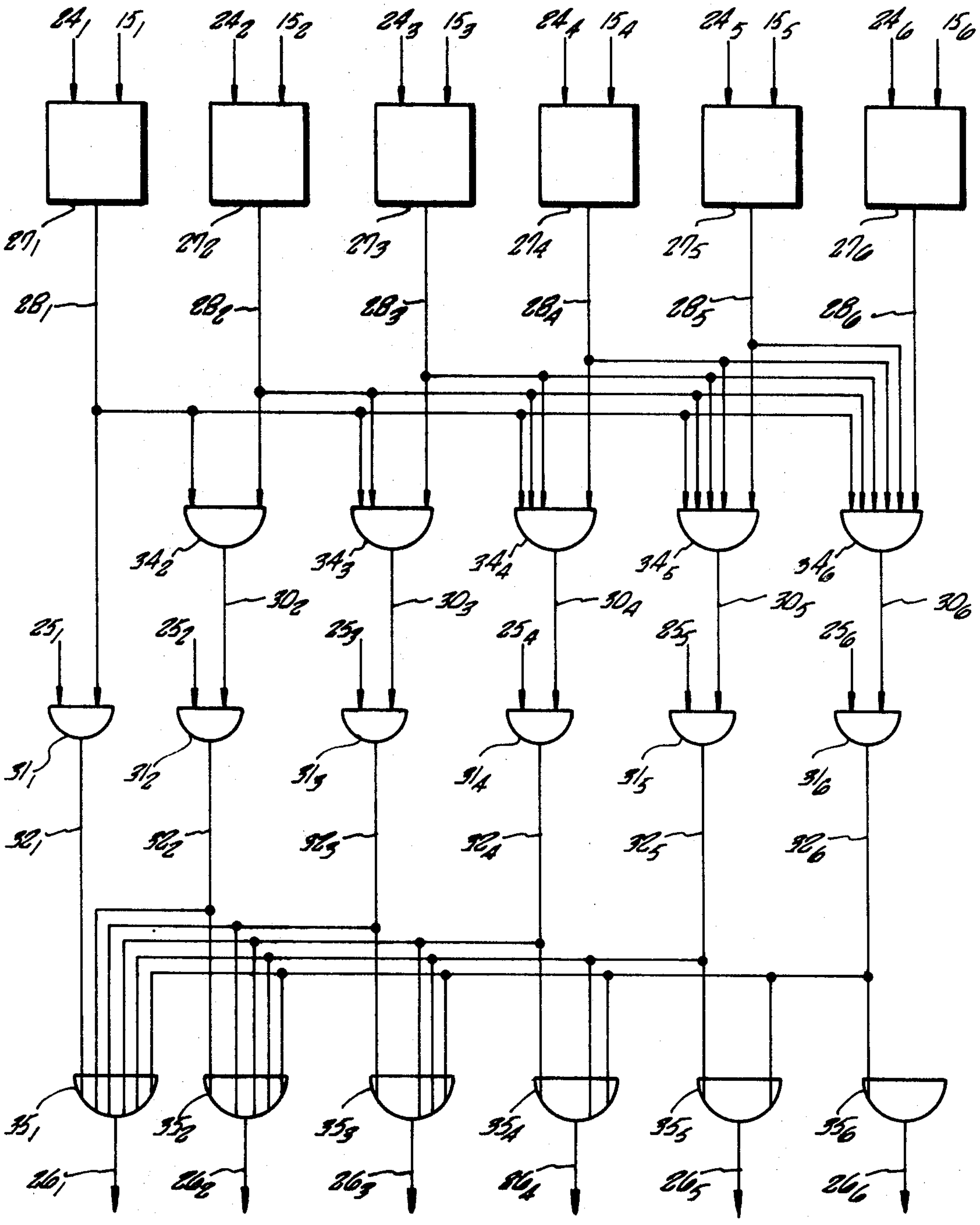
FIG. 3 depicts in greater detail the detection circuitry of FIG. 1 in which the stages of the detection circuitry are connected in parallel.

FIG. 3 depicts the detection circuitry 16 of FIG. 1 in which the stages of the detection circuitry are connected in parallel rather than in series as shown in FIG. 2. The detection circuit of FIG. 2 has an inherent propagation delay as a result of the serial propogation of both the "forward carry" signal and the "reverse carry" signal. This propagation delay resulting from the serial configuration used in FIG. 2 is eliminated by means of the parallel configuration shown in FIG. 3. FIG. 3, for illustrative purposes, depicts only the first six stages of detection circuitry 16. Signals on lines $28_1$ and $28_2$ are presented to each of the AND gates $34_2$ through $34_6$; signals on lines $28_3$ are presented to each of the AND gates $34_3$ through $34_6$; signals on line $28_4$ are presented to each of the AND gates $34_4$ through $34_6$; signals on line $28_5$ are presented to each of the AND gates $34_5$ and $34_6$; and signals on line $28_6$ are presented to AND gate $34_6$. By reason of the parallel connections between the lines $28_1$ through $28_6$ and the AND gates $34_2$ through $34_6$, the "forward carry" signal is simultaneously presented to the proper ones of the AND gates $34_2$ through $34_6$. Consequently no time delay occurs by reason of any serial propagation of the "forward carry" signal from one stage to the next.

Similarly signals on line $32_1$ are presented to OR gate $35_1$; signals on line $32_2$ are presented to OR gates $35_1$ and $35_2$; signals on line $32_3$ are presented to OR gates $35_1$ through $35_3$; signals on line $32_4$ are presented to OR gates $35_1$ through $35_4$; and signals on lines $32_5$ and $32_6$ are presented to OR gates $35_1$ through $35_5$. As a result of the parallel connections between the lines $32_1$ through $32_6$ and the OR gates $35_1$ through $35_5$, delay time resulting from the serial propagation of the "reverse carry" signal between stages is eliminated. If, for example, comparison circuits $27_1$ through $27_4$ determine that a match exists between the first four stages of counting circuit 10 and the first four stages of reset register 17, a "forward carry" signal will simultaneously be presented on each of the lines $28_1$, $30_2$, $30_3$ and $30_4$. If the truncation register 18 at this time presents a signal on line $25_4$ indicating that the first four stages of counting circuit 10 comprise a truncated section, a "reverse carry" signal appearing on line $32_4$ will cause reset signals to be simultaneously presented on lines $26_1$ through $26_4$. Thus the circuit arrangement shown in FIG. 3 eliminates both the serial propagation delay time of the "forward carry" and of the "reverse carry" signals. A disadvantage inherent in the arrangement of FIG. 3, however, is that the AND gates 34 associated with succeeding ones of the stages require increasing numbers of input terminals and become increasingly costly as the number of stages increases. A similar problem is presented by the number of inputs required by the OR gates 35.

Figure 4:
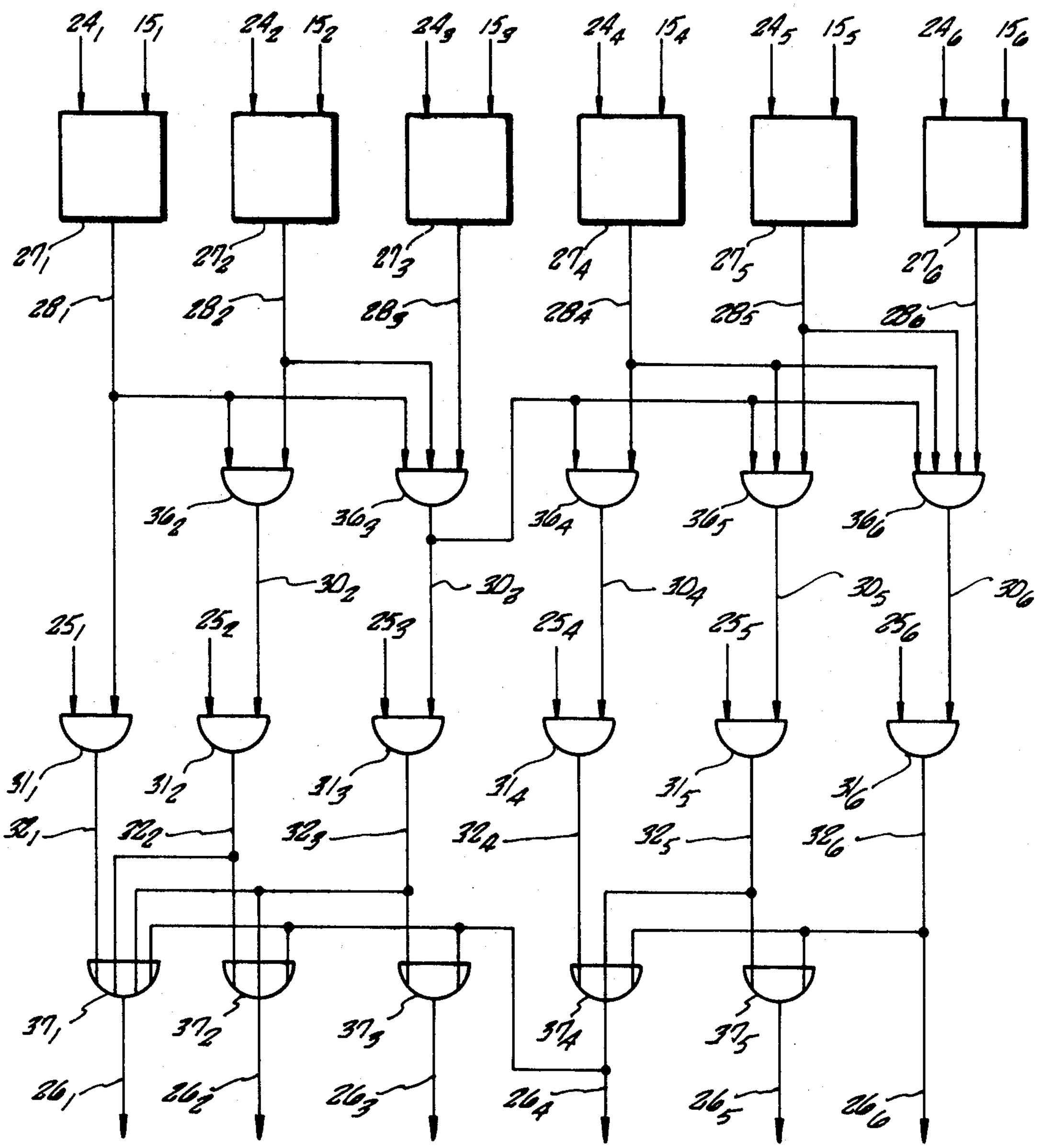
FIG. 4 depicts in greater detail the detection circuitry of FIG. 1 in which the stages of the detection circuitry are connected in series-parallel.

FIG. 4 represents an embodiment of the detection circuitry 16 which represents a compromise between the serial embodiment of FIG. 2 and the parallel embodiment of FIG. 3. In FIG. 4 the detection circuitry 16 is arranged in a number of multistage groupings. Within each grouping a parallel arrangement is utilized while the groupings are connected together in series. Thus FIG. 4 again depicts the first six stages of detection circuitry 16. In FIG. 4 the first three stages are connected in parallel and the next three stages are interconnected in parallel while stage three is serially connected to stage four. Thus signals on line $28_1$ are presented to AND gates $36_2$ and $36_3$; signals on line $28_2$ are presented to gates $36_2$ and $36_3$; signals on line $28_3$ are presented to gate $36_3$; signals on line $28_4$ are presented to AND gates $36_4$ through $36_6$; signals on line $28_5$ are presented to gates $36_5$ and $36_6$; and signals on line $28_6$ are presented to gate $36_6$. In addition signals on line $30_3$ are presented to gates $36_4$ through $36_6$.

In similar fashion signals on line $32_1$ are presented to OR gate $37_1$; signals on line $32_2$ are presented to gates $37_1$ and $37_2$; signals on line $32_3$ are presented to gates $37_1$ through $37_3$; signals on line $32_4$ are presented to gate $37_4$; and signals on lines $32_5$ and $32_6$ are presented to gates $37_4$ and $37_5$. In addition, signals on line $26_4$ are presented to gates $37_1$ through $37_3$.

If, during the operation of the embodiment of detection circuitry 16 shown in FIG. 4, comparison circuits $27_1$ through $27_5$ detect a match between the first five stages of counter 10 and the first five stages of reset register 17, for example, a "forward carry" signal is presented on each of the lines $30_2$ through $30_5$. The delay time between the signals presented on lines $30_2$ and $30_5$, however, is that produced by a single AND gate rather than that produced by three serially connected AND gates as would be the case in the embodiment shown in FIG. 2. Thus, the embodiment shown in FIG. 4 presents a "-forward carry" delay time only slightly greater than that developed in the circuit of FIG. 3 while reducing the complexity of gates required by the circuit of FIG. 3.

If in the example, truncation register 18 indicates that a first truncation section comprises five stages, reset signals will be presented on lines $26_1$ through $26_5$ with the signals on lines $26_1$ through $26_3$ appearing later than the signals on lines $26_4$ and $26_5$ by only the time delay inherent in a single AND gate. Thus the circuit shown in FIG. 4 accomplishes a reduction in "reverse carry" delay time over that inherent in FIG. 2, and a reduction in cost of gate circuitry over that required by FIG. 3.

Figure 5:
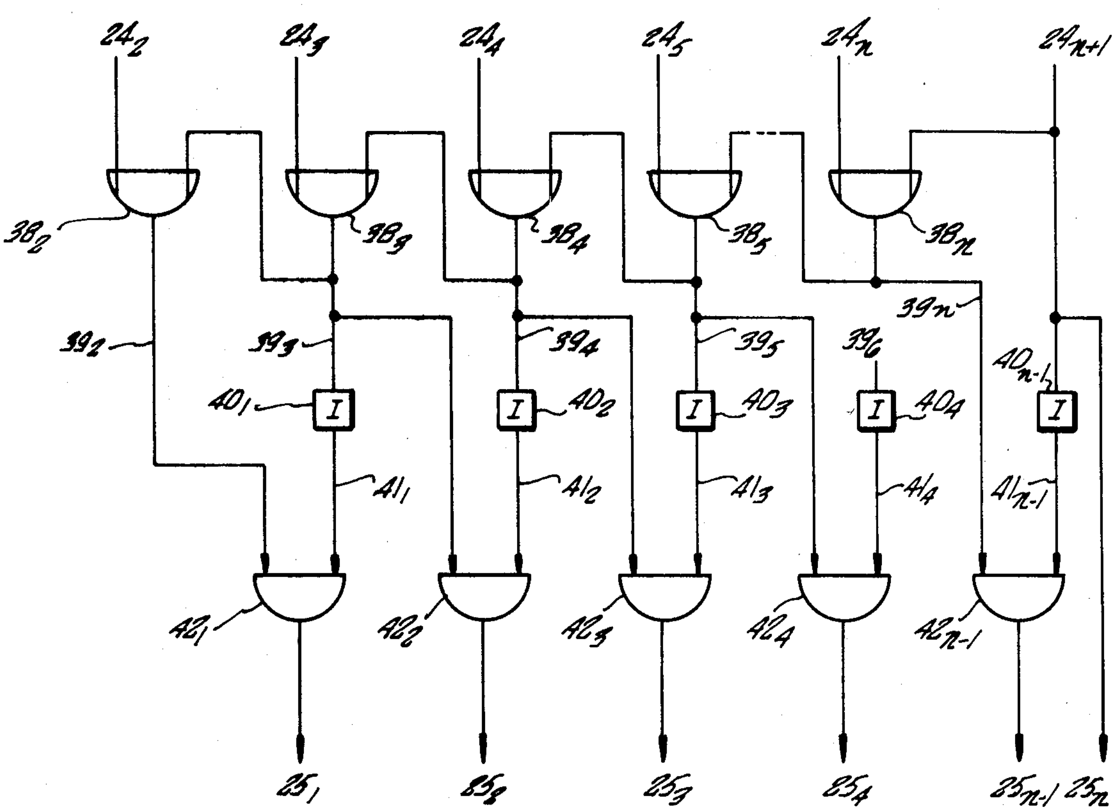
FIG. 5 depicts in greater detail a detection circuit which may be utilized in another embodiment of the programmable counting circuit according to this invention.

FIG. 5 depicts decoding circuitry which may be utilized in conjunction with detection circuitry 16 to achieve a single truncation of counting circuit 10 without use of truncation register 18. In this embodiment the contents of reset register 17 are utilized both to manifest the particular value at which the stages of counter 10 are to be reset and to indicate the number of stages in the single truncation of counting circuit 10. Reset register 17, when so utilized, advantageously contains one stage more than does counting circuit 10. Thus, if counting circuit 10 is an "$n$" stage counter, reset register 17 will comprise "$n$+1a" stages.

In FIG. 5 signals presented on lines $24_2$ through $24_n$ are presented, respectively, to OR gates $38_2$ through $38_n$. Additionally, signals on line $24_{n+1}$ are presented to OR gate $38_n$. Outputs of gates $38_2$ through $38_n$ are presented on lines $39_2$ through $39_n$, respectively. Signals on line $39_3$ are presented to OR gate $42_2$; signals on line $39_4$ are presented to gate $42_3$; signals on line $39_5$ are presented to gate $42_4$; and signals on line $39_n$ are presented to the gate $42_{n11}$.

Signals on lines $39_3$ through $39_5$ are presented to inverters $40_1$ through $40_3$, respectively, and signals on line $39_6$ from gate $38_6$, not shown, are presented to inverter $40_4$; signals on line $39_n$ are presented to inverter $40_{n12}$, not shown; and signals on line $24_{n+1}$ are presented to inverter $40_{n11}$. The inverters are shown in block diagram form and comprise well-known circuits capable of presenting a signal on their output lines $41_1$ through $41_{n11}$ only in the absence of signals on their respective input lines. Signals on lines $41_1$ through $41_{n11}$ are presented to AND gates $42_1$ through $42_{n11}$, respectively; and signals on lines $39_2$ through $39_n$ are also presented to AND gates $42_1$ through $42_{n11}$, respectively. The output signals passed by the AND gates $42_1$ through $42_{n11}$ are presented on lines $25_1$ through $25_{n11}$, respectively, and are utilized to manifest truncation information to the detection circuitry shown in FIGS. 2 through 4. Additionally, signals on line $24_{n+1}$ are presented on line $25_n$ in FIGS. 2, 3 and 4.

The circuitry shown in FIG. 5 decodes signals presented on lines $24_2$ through $24_{n+1}$ to manifest truncation information on lines $25_1$ through $25_n$ without the use of truncation register 18.

The last binary "1" stored in reset register 17 is utilized in accordance with the embodiment of decoding circuitry shown in FIG. 5 to indicate that the preceding stage is the last stage of the single truncation section of counting circuit 10. The decoding circuitry shown in FIG. 5 thus detects this last binary "1" appearing in reset register 17. This last binary "1" in register 17 will be followed by binary "0's" except in that case where all stages of the counting circuit 10 are to be utilized in which case a binary "1" will appear in the last stage of register 17. As shown in FIG. 5, a signal appearing on line $24_{n+1}$ is immediately translated to a signal on line $25_n$. Additionally the signal on line $24_{n+1}$ enables all of the OR gates $38_2$ through $38_n$ thereby presenting signals to the inputs of each inverter $40_1$ through $40_{n11}$ which, in turn, prevent gates $42_1$ through $42_{n11}$ from presenting signals on any of the lines $25_1$ through $25_{n11}$. Consequently line $25_n$ would, in this case, be the only one of the lines 25 having a signal presented thereon, thus indicating that the entire length of counter 10 is to be utilized.

In instances where a single truncation of the total number of stages of counter 10 is to be accomplished, the last binary "1" in reset register 17 will be followed by a string of binary "0's". The decoding circuitry of FIG. 5 detects a last binary "1" stored in register 17 which is followed by a binary "0". Thus, for example, if the first three stages of counter 10 comprise a truncation section, the last binary "1" appearing in register 17 will be in the fourth stage of this register. Consequently, a signal is presented on line $24_4$ from register 17. The signal on line $24_4$ enables OR gate $38_4$ which, in turn, enables all preceding OR gates 38. None of the OR gates 38 subsequent to gate $38_4$ will be enabled since no signal is presented on any of the lines 24 subsequent to line $24_4$. Consequently a signal is presented on line $39_4$ but not on line $39_5$. In the absence of a signal on line $39_5$, inverter $40_3$ presents a signal on line $41_3$. The signals on line $39_4$ and $41_3$ enable gate $42_3$ thereby presenting a signal on line $25_3$ indicating that the truncation section of counter 10 comprises three stages. None of the other lines will have a signal presented thereon. None of the lines $25_4$ through $25_n$ will have a signal thereon since no signal appears on line $24_{n+1}$ and since gates $42_4$ through $42_{n11}$ will not be enabled due to the absence of signals on any of the lines $39_5$ through $39_n$. Neither of the gates $42_1$ or $42_2$ can be enabled, in this example, regardless of the signals presented on lines $24_1$ through $24_3$. This results since the output of gate $38_4$ enables all preceding gates 38 thereby presenting signals to inverters $40_1$ and $40_2$ which, in turn, prevent the enabling of their associated gates $42_1$ and $42_2$. Therefore, the only one of the lines 25 which can have a signal presented thereon is that line 25 associated with the stage immediately preceding the last binary "1" stored in reset register 17. Consequently the decoding circuitry of FIG. 5 may advantageously be utilized where a single truncation of counting circuit 10 is desired, and may utilize the single register 17 to present truncation information on the lines 25 without requiring the additional truncation register 18.

What have been described are considered to be only illustrative embodiments of the present invention. Accordingly, it is to be understood that various and numerous other arrangements may be devised by one skilled in the art without departing from the spirit and scope of this invention.

We claim:

1. A programmable counting circuit comprising:
a multistage counting circuit;
a truncation register;
the truncation register having predetermined information bits therein identifying at least two discrete groups of stages within the counting circuit;
a reset register;
the reset register having predetermined information values stored therein and associated with respective ones of the discrete groups of stages;
means for periodically incrementing information values stored in the multistage counting circuit; and
means responsive to the contents of the multistage counting circuit, the contents of the truncation register and the contents of the reset register for detecting matches between the contents of the discrete groups of stages and their associated information values and for resetting any group of stages for which a match is detected.

2. A programmable counting circuit according to claim 1 further comprising means for programmatically altering the contents of the truncation register and of the reset register.

3. A programmable counting circuit comprising:
a counting circuit having a plurality of stages;
means for periodically incrementing information values stored in the counting circuit;
a truncation register;
the truncation register having bit locations associated with respective ones of the stages and predetermined information bits therein identifying at least one discrete group of stages within the counting circuit;
a reset register;
the reset register having bit locations associated with respective ones of the stages and predetermined information bits therein;
means for comparing each stage of the counting circuit with its associated bit location in the reset register and for determining matches therebetween;
means for generating a first signal associated with the highest order stage for which a match occurs with its associated bit location in the reset register and for which matches between all lower order stages and their associated bit locations in the reset register occur;
means for generating a second signal when a first signal is generated with respect to a stage having a truncation information bit associated therewith; and
means responsive to the second signal for resetting all stages of the discrete group of stages identified by the last mentioned truncation information bit.

4. A programmable counting circuit according to claim 3 in which the means for generating a first signal comprises a plurality of logic means associated with respective ones of the stages, each logic means generating a first signal with respect to its associated stage only in response to the determination of a match with respect both to its associated stage and all prior stages.

5. A programmable counting circuit according to claim 4 in which the comparing means in response to the determination of each match presents a signal to the logic means associated with the stage for which a match is determined and presents signals to the logic means of all higher order stages.

6. A programmable counting circuit according to claim 5 in which the logic means are connected in parallel.

7. A programmable counting circuit according to claim 4 in which the logic means are connected in series.

8. A programmable counting circuit according to claim 4 in which the logic means are connected in series-parallel.

9. A programmable counting circuit according to claim 3 in which the resetting means comprises a plurality of logic means associated with respective ones of the stages, each logic means presenting a reset signal on an associated reset line in response to a second signal generated with respect to its associated stage or in response to a second signal generated with respect to any higher order stage.

10. A programmable counting circuit according to claim 9 in which the means for generating a second signal presents the second signal to the logic means associated with the stage having a truncation information bit associated therewith and to all of the logic means associated with lower order stages.

11. A programmable counting circuit according to claim 10 in which the logic means are connected in parallel.

12. A programmable counting circuit according to claim 9 in which each logic means presents a reset signal on its associated reset line in response to a signal presented on the reset line of any logic means associated with a higher order stage.

13. A programmable counting circuit according to claim 12 in which the logic means are connected in series.

14. A programmable counting circuit according to claim 9 in which the logic means are connected in series-parallel.

15. A programmable signal generating circuit comprising:
a multistage counting circuit;
means for periodically incrementing information values stored in the counting circuit;
the counting circuit generating signals indicative of the information values stored therein;
a multistage truncation register, each stage being associated with a respective stage of the counting circuit, the truncation register having a plurality of truncation bits stored therein, the bits identifying a plurality of truncated groups of stages within the counting circuit;
a multistage reset register, each stage also being associated with a respective stage of the counting circuit and having predetermined information values stored therein;
means for comparing each stage of the counting circuit with the associated stage of the reset register and for determining matches therebetween;
means for generating a "forward carry" signal with respect to the highest order stage for which a match occurs with its associated bit location in the reset register and for which matches between all lower order stages and their associated bit locations in the reset register occur;
means responsive to the "forward carry" signal and to the contents of the truncation register for generating a "reverse carry" signal with respect to any stage comprising the highest order stage of a truncated group of stages and with respect to which a "forward carry" signal is generated; and
means responsive to the "reverse carry" signal for resetting its associated stage and all lower order stages of the counting circuit.

16. A programmable signal generating circuit comprising:
a multistage counting circuit;
means for periodically incrementing information values stored in the counting circuit;
the counting circuit generating signals indicative of the information stored therein;
a single multistage register having at least one more stage then the counting circuit, an information bit in a selected stage therein manifesting the highest order stage of a single truncated group of stages within the counting circuit and an information value associated with this group of stages;
means for comparing the information value stored in the truncated group of stages of the counting circuit with the information value stored in the register and for detecting a match therebetween; and
means responsive to detection of a match and to the information bit in the selected stage of said register for resetting only the stages of the single truncated group of stages within the counting circuit independent of the information value in the stages of the counting circuit not within the truncated group.

17. A programmable signal generating circuit according to claim 16 in which the multistage counting circuit has "*n*" stages and the register has "*n*+1a" bit locations, the first "*n*" bit locations being associated with respective ones of the "*n*" stages.

18. A programmable signal generating means according to claim 17 in which the comparing means comprises means for detecting the highest order bit location within the register in which a particular binary value is stored.

PO-1050
(5/69)

UNITED STATES PATENT OFFICE
CERTIFICATE OF CORRECTION

Patent No. 3,581,066 Dated May 25, 1971

Inventor(s) Douglas R. Maure and Mei Goon Wong

It is certified that error appears in the above-identified patent and that said Letters Patent are hereby corrected as shown below:

In the ABSTRACT, lines 6 and 7, "forward carry" should be enclosed with quotation marks.

Column 1, immediately after the title insert the following paragraph:

--Cross-Reference to Related Application
The present invention is related to the subject matter of an application of the present applicants, Serial Number 710,861, filed on March 6, 1968 and assigned to the assignee of the present invention.--

Column 3, line 39, for "$30_{n11}$" read --$30_{n-1}$--;
line 48, for "$32_{n11}$" read --$32_{n-1}$--;
line 48, for "$33_{n11}$" read --$33_{n-1}$--;
line 50, for "$33_{n11}$" read --$33_{n-1}$--;
line 51, for "$26_{n11}$" read --$26_{n-1}$--;
line 53, for "$33_{n11}$" read --$33_{n-1}$--;
line 54, for "$26_{n11}$" read --$26_{n-1}$--.

Column 4, line 25, add closing quotation marks after "n-1";
line 27, add closing quotation marks after "n-1";
line 30, for "$29_{n11}$" read --$29_{n-1}$--;
line 30, for "$31_{n11}$" read --$31_{n-1}$--;
line 31, for "$25_{n11}$" read --$25_{n-1}$--;
line 32, for "$31_{n11}$" read --$31_{n-1}$--;
line 34, for "$26_{n11}$" read --$26_{n-1}$--; for "$33_{n12}$" read --$33_{n-2}$-
line 36, for "$26_{n11}$" read --$26_{n-1}$--;
line 36, add closing quotation marks after "n-1".

Column 5, line 67, for "n+1a" read --n+1--;
line 75, for "$42_{n11}$" read --$42_{n-1}$--;

(Cont'd. on page 2)

PO-1050
(5/69)

UNITED STATES PATENT OFFICE
CERTIFICATE OF CORRECTION

Patent No. 3,581,066 Dated May 25, 1971

Inventor(s) Douglas R. Maure

It is certified that error appears in the above-identified patent and that said Letters Patent are hereby corrected as shown below:

PAGE 2

Column 6, line 4, for "$40_{n12}$" read --$40_{n-2}$--;
line 5, for "$40_{n11}$" read --$40_{n-1}$--;
line 8, for "$41_{n11}$" read --$41_{n-1}$--;
line 9, for "$41_{n11}$" read --$41_{n-1}$--;
line 10, for "$42_{n11}$" read --$42_{n-1}$--;
line 12, for "$42_{n11}$" read --$42_{n-1}$--;
line 13, for "$42_{n11}$" read --$42_{n-1}$--;
line 14, for "$25_{n11}$" read --$25_{n-1}$--;
line 35, for "$40_{n11}$" read --$40_{n-1}$--;
line 36, for "$25_{n11}$" read --$25_{n-1}$--;
line 60, for "$42_{n11}$" read --$42_{n-1}$--.

Column 9, line 6, for "'n+1a'" read --"n+1"--.

Signed and sealed this 26th day of October 1971.

(SEAL)
Attest:

EDWARD M.FLETCHER,JR.
Attesting Officer

ROBERT GOTTSCHALK
Acting Commissioner of Patents